United States Patent [19]
Stoquelet

[11] 3,940,086

[45] Feb. 24, 1976

[54] REEL FOR A CABLE

[76] Inventor: Michel R. A. Stoquelet, 214 rue Chapu 77, Le-Mee-Sur-Seine, France

[22] Filed: Dec. 13, 1973

[21] Appl. No.: 424,449

[30] Foreign Application Priority Data
Nov. 23, 1973 France .................... 73.41752

[52] U.S. Cl. ............................................. 242/118.6
[51] Int. Cl.² ......................................... B65H 75/14
[58] Field of Search .......... 242/118.6, 118.7, 118.8, 242/118.61, 118.62, 118.4, 77.3, 77.4

[56] References Cited
UNITED STATES PATENTS

| | | | |
|---|---|---|---|
| 851,367 | 4/1907 | Mossberg .......................... | 242/118.6 |
| 962,654 | 6/1910 | Mossberg ........................ | 242/118.6 X |
| 1,924,541 | 8/1933 | Clemmons .......................... | 242/77.4 |
| 2,096,965 | 10/1937 | Howsam .......................... | 242/118.6 |
| 2,582,597 | 1/1952 | McCaskie ........................ | 242/118.6 |
| 2,583,995 | 1/1952 | Burlein ............................ | 242/118.6 |
| 2,693,323 | 11/1954 | Jarmicki .......................... | 242/118.7 |
| 2,753,622 | 7/1956 | Bieber et al. ...................... | 242/77.3 |
| 2,874,919 | 2/1959 | DeLong ............................ | 242/118.6 |
| 3,383,070 | 5/1968 | Feaster ............................ | 242/118.6 |

*Primary Examiner*—Leonard D. Christian

[57] ABSTRACT

A cable reel comprises a pair of annular flanges and a hollow cylindrical core extending between the flanges. Each end portion of the core is engaged in an annular groove formed on the inner surface of each flange. A tubular element is located within the core to act as a guide for a supporting spindle, the end portions of the element being engaged in stepped portions of the flanges. The flanges are reinforced by radial ribs and are retained against the core by means of at least three tie rods.

7 Claims, 4 Drawing Figures

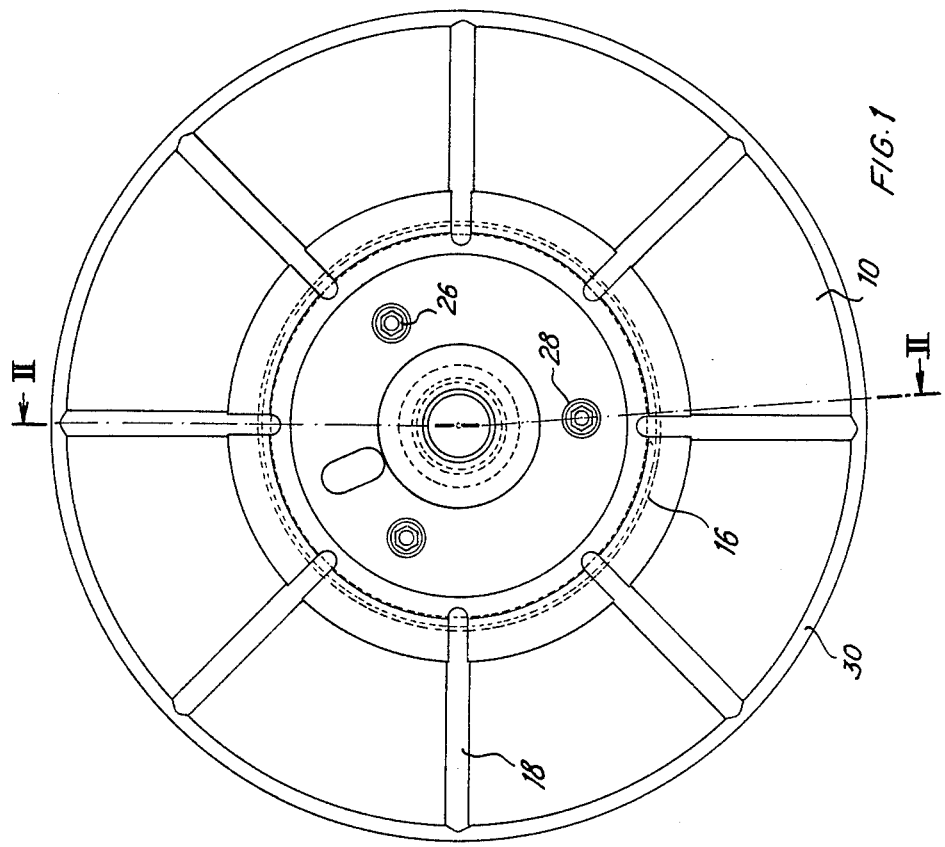
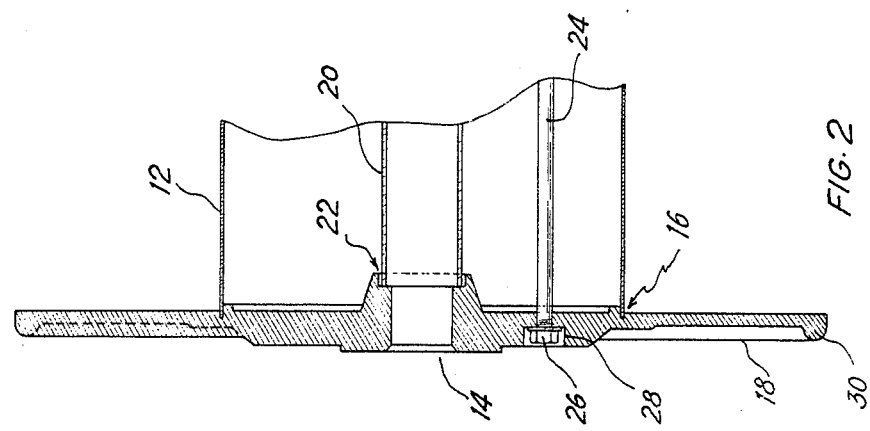

REEL FOR A CABLE

FIELD OF THE INVENTION

The present invention relates to a reel for a cable.

SUMMARY OF THE INVENTION

According to the present invention, there is provided a reel for a cable, said reel comprising a hollow cylindrical core, two disc-shaped flanges, each flange having a central aperature arranged to permit passage of a supporting spindle, and each flange having on its inner surface an annular groove which receives a respective end portion of the core, each said flange comprising a plurality of radial reinforcing ribs on its outer surface, and a stepped portion formed on its inner surface adjacent the central aperture, an inner tubular element arranged to act as a guide for the supporting spindle, the respective end portions of the tubular element being engaged with the stepped portion of each flange, at least three tie rod means, at least one end portion of each tie rod means being screw threaded, and nut means cooperating with the screw threaded end portion of the rod means to effect retention of the flanges at each end portion of the core.

BRIEF DESCRIPTION OF THE DRAWINGS

Embodiments of the invention will now be described, by way of example only, with reference to the accompanying diagrammatic drawings, in which:

FIG. 1 is an elevation of a reel in accordance with the invention;

FIG. 2 is a fragmentary section taken on line II—II of FIG. 1;

DESCRIPTION OF THE PREFERRED EMBODIMENTS

Figure 3:
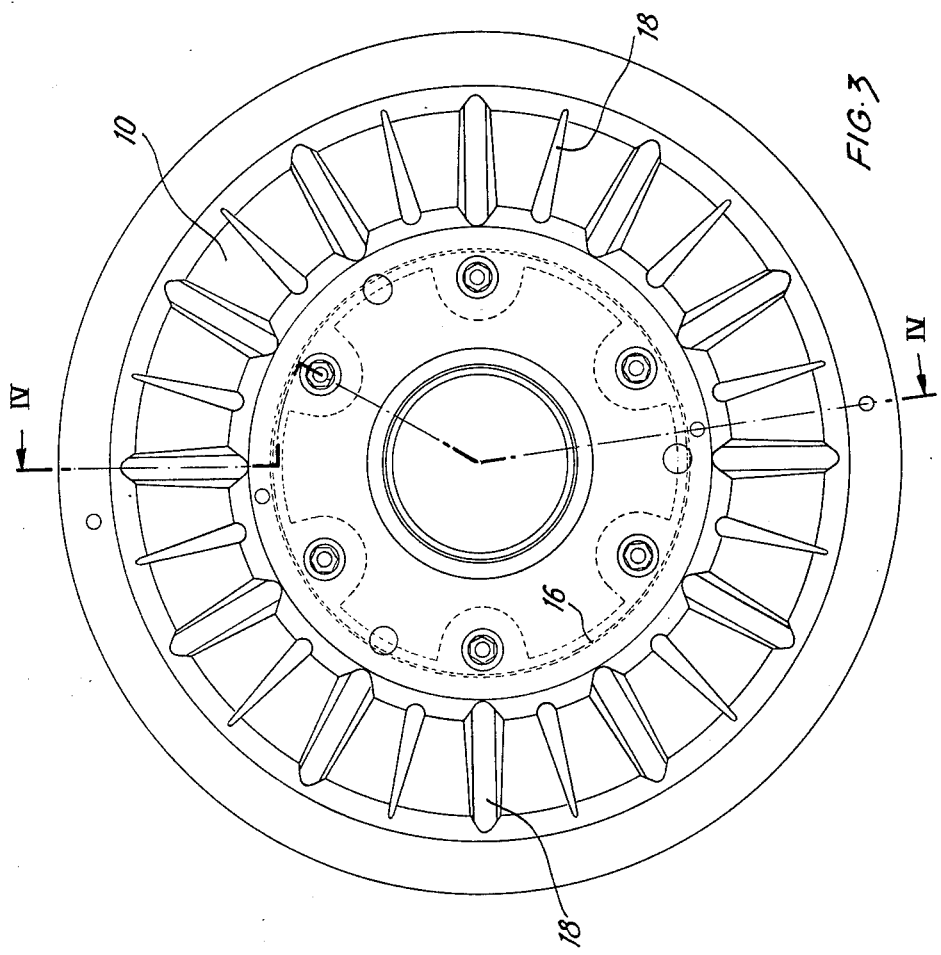
FIG. 3 is an elevation of another reel in accordance with the invention.

The reel shown in FIGS. 1 and 2 is arranged to receive a thin wire, for example a telephone wire, and comprises a pair of flanges 10 each having a diameter of about 400 mms. Preferably the flanges are formed from a laminated fibreglass-polyester plastics material. A central core 12 of the reel is in the form of a hollow cylinder on which the wire is directly wound. The central core 12 is advantageously made of metal such that the reel can electrically connect the wire wound on the core and a framework supporting the reel. This arrangement enables checks to be made on the wire during the production or winding of the wire.

Each of the two flanges 10 of the reel is disc-shaped and has a central aperture 14 which permits passage of a spindle arranged to support the reel. On the inner surface of each flange 10, there is formed a V-sectioned annular channel or groove 16 which is situated at substantially equal distances from the centre of the flange and from its outer rim. Each annular groove 16 is arranged to receive a respective end portion of the core 12 and is moulded integrally with the inner surface of the flange. This arrangement renders it possible to obviate the use of protective webs, adhesive-coated fabrics or other materials which would otherwise be required at the level of the joint between the core 12 and the flange 10 to plug the gap which would be liable to damage the wire whilst the latter is being wound. The dimensions of the groove 16 correspond to those of the corresponding end portion of the core 12.

The outer surface of each flange comprises a plurality of radial reinforcing ribs 18, which are preferably spaced apart evenly from each other. The ribs 18 act to prevent deflection of the flanges resulting from tight winding of the wire.

A central element 20 of tubular form is located within the core 12 and acts as a guide for the reel-supporting spindle. Each of the two end portions of the tubular element 20 fits accurately into a stepped shoulder portion 22 of a respective flange 10. The inner diameter of the element 20 is approximately equal to the diameter of the aperture 14.

The reel is maintained in its assembled state by at least three tie-bolts 24, each having at least one screw-threaded end portion which receives a nut 26 so that the two flanges 10 are held at each end portion of the core 12 and of the tubular element 20. Preferably the holes which receive the tie-bolts 24 are formed within a reinforced portion of the flanges 10 to increase the strength of the assembled reel.

The annular groove 16 has a projection (not shown) formed at an optional point to cooperate with a notch formed in the corresponding end portion of the core 12 by a suitable notching process. Given that the rotation of the reel on its spindle is produced by entrainment of its flanges, it is thus necessary for the core 12 to be rigidly coupled to the flanges 10. It is quite clear that, in the case in which both flanges of the reel have a groove having an immobilising projection, it is necessary that these projections should be positioned in an identical position on each flange with respect to the holes intended to receive the tie-bolts. Upon assembling the reel, these holes should be in exact mutual alignment in pairs in the locked position of the flanges and of the core.

The stress acting on the flanges to deflect same is greatest in the area adjacent to the core 12, and it is therefore sufficient for the reinforcing ribs to be formed to start in this area.

Figure 4:
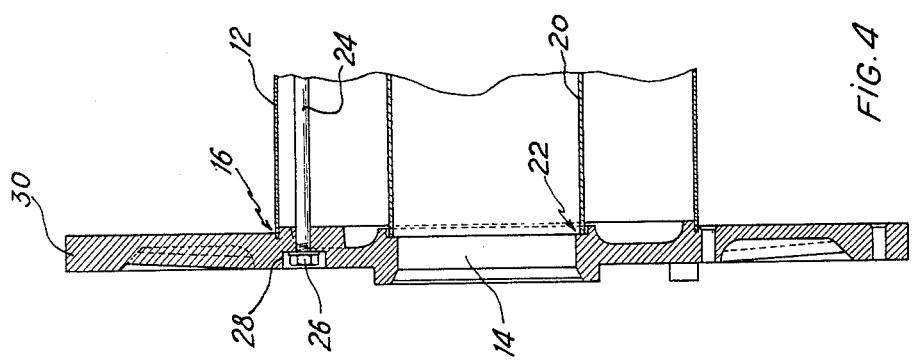
FIG. 4 is a fragmentary section taken on line IV—IV of FIG. 3. In the two embodiments, identical elements are designated by the same reference numerals.

The reinforcing ribs are arranged to impart to the flanges 10, a resistance proportional to the deflecting stress acting on the flanges 10. However, this stress is greatest close to the core 12 and diminishes towards the peripheral rim of the flanges 10; thus, as shown in FIGS. 3 and 4 the cross-sectional area of the ribs 18 decreases towards the rim of the flanges 10, the flanges 10 being about 600 mm in diameter. It is thus possible to obtain optimum utilization of the reel capacity, without causing a flange deflection exceeding 2 to 3 mms between the two flanges, at the periphery of the reel. It will be recalled that the material used to produce the flanges is a laminated plastics material.

In the two embodiments shown, each flange preferably comprises three recesses 28 appropriate to receive the heads or the nuts 26 of the tie-rods 24. The heads or nuts 26 are thereby located within the thickness of the flanges 10 and do not project outwardly beyond the flanges.

In order to obtain a strong but lightweight flange 10, each flange has a peripheral reinforcing rim 30. The presence of this rim 30 renders it possible to secure a substantial increase in the impact strength of the most exposed portion of the reel, namely the peripheral edge of the flanges.

At least one of the two flanges 10 of the reel comprises a recess 32 of elongate form arranged to cooperate with a driving finger rigid with the reel-supporting spindle whereby the reel is fast for rotation with the spindle.

This recess 32 is formed close to the centre of the reel in a reinforced portion of the flange 10, in such manner that the driving finger has a greater area of contact on the sides of the recess 32. Even if the reel is to be driven by means of a single driving finger, it is advantageous for each flange to be provided with a recess 32 whereby the two flanges are identical.

The reel particularly described is thus formed from several rapidly demountable and interchangeable elements. It is possible to replace single component elements of the reel, for example a flange which has been broken or deformed by a blow. The arrangement of the ribs renders it possible to reduce substantially the weight of the flanges and thus of the reel as a whole, whilst retaining the strength of the reel.

What is claimed is:

1. A reel for very thin cables, such as telephonic cables, comprising, a hollow cylindrical core, two disc-shaped flanges made of a molded plastic material, each flange having a central aperture arranged to permit passage of a supporting spindle, and each flange being provided on its inner surface with an annular groove molded thereinto so as to have a radial size equal to the thickness of said core, the opposite annular end portions of said cylindrical core being removably received in the respective annular groove of the correspondng flange substantially without play and being supported therein radially inwardly and outwardly, a plurality of radial reinforcing ribs provided on the outer surface of each flange, each said rib extending radially outwardly from a position adjacent to but radially outwardly from the annular groove to a position adjacent the peripheral edge of the flange, the cross-sectional area of each said rib decreasing with increasing distance from the center of the flange, a stepped portion formed on the inner surface of each flange which is adjacent the central aperture, an inner tubular element arranged to act as a guide for the supporting spindle, the respective end portions of the tubular element being engaged with the stepped portion of each flange, and a plurality of tie rod means and nut connections arranged between the two flanges inwardly of said cylindrical core to urge the flanges toward one another.

2. A reel according to claim 1 wherein each said flange further comprises,
   a projection in each said annular groove, each end portion of the core having a notch which cooperates with the projection whereby to prevent rotation of the flanges relative to the core.

3. A reel according to claim 1, wherein each said flange has a recess in its outer surface arranged to receive a respective said nut means, whereby the nut means lie within the thickness of the flange.

4. A reel according to claim 1, wherein each flange further comprises
   a peripheral reinforcing rim.

5. A reel according to claim 1, wherein at least one flange has an elongate recess arranged to cooperate with a finger rigid with the supporting spindle.

6. A reel according to claim 5, wherein the recess is located within a reinforced portion of the flange whereby to provide a greater area of contact for the finger on the inner surface of the recess.

7. A reel according to claim 6, wherein the recess is located adjacent the center of the flange.

* * * * *